United States Patent
Qian et al.

(10) Patent No.: US 6,462,122 B1
(45) Date of Patent: Oct. 8, 2002

(54) INTERCALATES FORMED WITH POLYPROPYLENE/MALEIC ANHYDRIDE-MODIFIED POLYPROPYLENE INTERCALANTS

(75) Inventors: Guoqiang Qian, Wheeling; Tie Lan, Lake Zurich; Aaron M. Fay, Island Lake, all of IL (US); Anthony S. Tomlin, Fife (GB)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/515,768

(22) Filed: Mar. 1, 2000

(51) Int. Cl.$^7$ ................................................. C08K 3/34
(52) U.S. Cl. ...................... 524/445; 523/215; 523/216; 524/446; 524/447; 524/492
(58) Field of Search .................................. 523/215, 216, 523/186; 524/262, 445, 446, 447, 492, 504, 528; 525/285, 301

(56) References Cited

U.S. PATENT DOCUMENTS

| | | | |
|---|---|---|---|
| 2,035,546 A | 3/1936 | Hamilton | 167/24 |
| 3,419,460 A | 12/1968 | Ure | 161/162 |
| 3,419,517 A | 12/1968 | Hedrick et al. | 260/37 |
| 3,515,626 A | 6/1970 | Duffield | 161/162 |
| 3,773,708 A | 11/1973 | Takahashi et al. | 260/41 R |
| 3,795,650 A | 3/1974 | Burns | 260/33.4 R |
| 3,912,532 A | 10/1975 | Simone | 106/308 N |
| 3,929,678 A | 12/1975 | Laughlin et al. | 252/526 |
| 3,929,849 A | 12/1975 | Oswald | 260/448 |
| 4,053,493 A | 10/1977 | Oswald | 260/448 |
| 4,125,411 A | 11/1978 | Lyons | 106/291 |
| 4,136,103 A | 1/1979 | Oswald | 260/448 |
| 4,210,572 A | 7/1980 | Herman et al. | 260/404 |
| 4,251,576 A | 2/1981 | Osborn et al. | 428/331 |
| 4,400,485 A | 8/1983 | Mukamal et al. | 524/446 |
| 4,431,755 A | 2/1984 | Weber et al. | 523/203 |
| 4,434,075 A | 2/1984 | Mardis et al. | 252/315.2 |
| 4,472,538 A | 9/1984 | Kamigaito et al. | 523/202 |
| 4,500,670 A | 2/1985 | McKinley et al. | 524/445 |
| 4,546,126 A | 10/1985 | Breitenfellner et al. | 523/216 |
| 4,546,145 A | 10/1985 | Kishida et al. | 524/780 |
| 4,600,744 A | 7/1986 | Libor et al. | 524/446 |
| 4,613,542 A | 9/1986 | Alexander | 428/290 |
| 4,624,982 A | 11/1986 | Alexander | 524/446 |
| 4,676,929 A | 6/1987 | Rittler | 252/315.2 |
| 4,739,007 A | 4/1988 | Okada et al. | 524/789 |
| 4,777,206 A | 10/1988 | Rittler | 524/445 |
| 4,789,403 A | 12/1988 | Rice | 106/417 |
| 4,798,766 A | 1/1989 | Rice | 428/404 |
| 4,810,734 A | 3/1989 | Kawasumi et al. | 523/216 |
| 4,842,651 A | 6/1989 | Ravet et al. | 106/487 |
| 4,849,006 A | 7/1989 | Knudson, Jr. | 71/64.11 |
| 4,851,021 A | 7/1989 | Bohrn et al. | 65/17 |
| 4,875,762 A | 10/1989 | Kato et al. | 350/357 |
| 4,889,885 A | 12/1989 | Usuki et al. | 524/443 |
| 4,894,411 A | 1/1990 | Okada et al. | 524/710 |
| 4,920,171 A | 4/1990 | Hutton, Jr. et al. | 524/446 |
| 4,956,121 A | 9/1990 | Tymon et al. | 252/378 R |
| 5,028,351 A | 7/1991 | Kato et al. | 252/315.2 |
| 5,032,546 A | 7/1991 | Giannelis et al. | 501/3 |
| 5,032,547 A | 7/1991 | Giannelis et al. | 501/3 |
| 5,091,462 A | 2/1992 | Fukui et al. | 524/504 |
| 5,102,948 A | 4/1992 | Deguchi et al. | 524/789 |
| 5,164,440 A | 11/1992 | Deguchi et al. | 524/444 |
| 5,164,460 A | 11/1992 | Yano et al. | 624/445 |

(List continued on next page.)

FOREIGN PATENT DOCUMENTS

| | | |
|---|---|---|
| DE | 1 642 122 | 7/1970 |
| DE | 281 585 A5 | 8/1990 |
| EP | 0 205 281 A3 | 12/1986 |
| EP | 0 335 653 A1 | 10/1989 |
| EP | 0 358 415 A1 | 3/1990 |
| EP | 0 479 031 A1 | 4/1992 |
| EP | 0 548 940 A1 | 6/1993 |
| EP | 0 619 182 A1 | 10/1994 |

(List continued on next page.)

OTHER PUBLICATIONS

Usuki, A; Kato, M; Okada, A; Kurauchi, T "Synthesis of Polypropylene–Clay Hybrid" Journal of Applied Polymer Science, vol. 63, 137–139 (1997).*

Kurokawa, Y; Yasuda, H; Oya, "Preparation of a Nanocomposite of Polypropylene and Smectite" A Journal of Material Science Letters 15 (1996) 1481–1483.*

Kawasumi, M; Hasegawa, N; Kato, M; Usuki, A; Okada, A "Preparation and Mechanical Properties of Polypropylene–Clay Hybrids" Macromolecules 1997, 30, 6333–6338.*

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

(List continued on next page.)

Primary Examiner—Edward J. Cain
(74) Attorney, Agent, or Firm—Marshall, Gerstein & Borun

(57) ABSTRACT

A nanocomposite concentrate composition comprising about 10 weight percent to about 90 weight percent of a layered silicate material and about 10 weight percent to about 90 weight percent of a matrix polymer comprising about 90–99.5% by weight of a polyolefin and about 0.5% to about 10%, preferably about 1% to about 6% by weight, of a maleic anhydride-modified polyolefin, based on the total weight of polyolefins, wherein the layered silicate material is dispersed uniformly throughout the matrix polymer. Shearing of the concentrate and later (after shear) addition of an added matrix polymer avoids thermal degradation of the added matrix polymer and optimizes the dispersion of the nanomer throughout the matrix polymer; provides increased tensile strength; and reduces degradation of the polymer by melt formation of a concentrate thereby decreasing heat degradation of added matrix polymer.

41 Claims, No Drawings

U.S. PATENT DOCUMENTS

| | | | |
|---|---|---|---|
| 5,204,078 A | 4/1993 | Tateyama et al. | 423/331 |
| 5,206,284 A | 4/1993 | Fukui et al. | 524/504 |
| 5,229,451 A | 7/1993 | Carter et al. | 524/493 |
| 5,248,720 A | 9/1993 | Deguchi et al. | 524/444 |
| 5,326,500 A | 7/1994 | Friedman et al. | 252/378 |
| 5,340,558 A | 8/1994 | Friedman et al. | 423/328.1 |
| 5,385,776 A | 1/1995 | Maxfield et al. | 428/297 |
| 5,391,437 A | 2/1995 | Miyasaka et al. | 528/425.5 |
| 5,414,042 A | 5/1995 | Yasue et al. | 524/789 |
| 5,428,094 A | 6/1995 | Tokoh et al. | 524/379 |
| 5,506,046 A | 4/1996 | Andersen et al. | 524/446 |
| 5,508,072 A | 4/1996 | Andersen et al. | 524/446 |
| 5,514,734 A | 5/1996 | Maxfield et al. | 523/204 |
| 5,552,469 A | 9/1996 | Beall et al. | 524/445 |
| 5,554,670 A | 9/1996 | Giannelis et al. | 523/209 |
| 5,578,672 A | 11/1996 | Beall et al. | 624/446 |
| 5,659,034 A | 8/1997 | Debord et al. | 546/2 |
| 5,667,886 A | 9/1997 | Gough et al. | 428/331 |
| 5,698,624 A | 12/1997 | Beall et al. | 524/445 |
| 5,721,306 A | 2/1998 | Tsipursky et al. | 524/449 |
| 5,730,996 A | 3/1998 | Beall et al. | 424/405 |
| 5,747,403 A | 5/1998 | Boyd et al. | 502/62 |
| 5,747,560 A | 5/1998 | Christiana et al. | 523/209 |
| 5,760,106 A | 6/1998 | Pinnavaia et al. | 523/209 |
| 5,760,121 A | 6/1998 | Beall et al. | 524/450 |
| 5,766,751 A | 6/1998 | Kotani et al. | 428/323 |
| 5,801,216 A | 9/1998 | Pinnavaia et al. | 523/209 |
| 5,804,613 A | 9/1998 | Beall et al. | 523/200 |
| 5,830,528 A | 11/1998 | Beall et al. | 427/220 |
| 5,837,763 A | 11/1998 | Ferraro et al. | 524/449 |
| 5,844,032 A | 12/1998 | Serrano et al. | 524/445 |
| 5,849,830 A | 12/1998 | Tsipursky et al. | 524/450 |
| 5,853,886 A | 12/1998 | Pinnavaia et al. | 428/403 |
| 5,877,248 A | 3/1999 | Beall et al. | 524/450 |
| 5,880,197 A | 3/1999 | Beall et al. | 524/445 |
| 5,910,523 A | 6/1999 | Hudson | 523/213 |
| 5,952,095 A | 9/1999 | Beall et al. | 428/332 |
| 5,955,094 A | 9/1999 | Beall et al. | 424/405 |
| 5,981,029 A | 11/1999 | Harada et al. | 428/143 |
| 5,994,445 A | 11/1999 | Kaschel et al. | 524/445 |
| 5,998,528 A | 12/1999 | Tsipursky et al. | 524/445 |
| 6,034,163 A | 3/2000 | Barbee et al. | 524/445 |
| 6,050,509 A | 4/2000 | Clarey et al. | 241/21 |
| 6,057,396 A | 5/2000 | Lan et al. | 524/445 |
| 6,071,988 A | 6/2000 | Barbee et al. | 523/210 |
| 6,083,559 A | 7/2000 | Beall et al. | 427/220 |
| 6,084,019 A | 7/2000 | Matayabas, Jr. et al. | 524/445 |
| 6,090,734 A | 7/2000 | Tsipursky et al. | 501/141 |
| 6,124,365 A | 9/2000 | Lan et al. | 516/101 |
| 6,126,734 A | 10/2000 | Beall et al. | 106/487 |
| 6,225,394 B1 * | 5/2001 | Lan et al. | 524/445 |

FOREIGN PATENT DOCUMENTS

| | | |
|---|---|---|
| EP | 0 645 181 A2 | 3/1995 |
| EP | 0 747 451 A2 | 12/1996 |
| EP | 0 761 739 A1 | 3/1997 |
| EP | 0 780 340 A1 | 6/1997 |
| EP | 807659 A1 * | 11/1997 |
| EP | 1055706 A1 * | 11/2000 |
| GB | 1 146 668 | 3/1969 |
| GB | 1 565 362 | 4/1980 |
| GB | 2 088 932 A | 6/1982 |
| WO | WO 93/04117 | 3/1993 |
| WO | WO 93/04118 | 3/1993 |
| WO | WO 93/11190 | 6/1993 |
| WO | WO 96/08526 | 3/1996 |
| WO | WO 98/01346 | 1/1998 |
| WO | WO 01/05880 A1 | 1/2001 |

OTHER PUBLICATIONS

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia et al., "Synthesis and Properties of Two–Dimensional Nonostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvation Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: SumGomary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Tokyo, Japan, pp. 243–251.

Wu, et al., "Structural, thermal, and electrical characterization of layered nanocomposites derived from sodium–montmorillonite and polyethers", *Chemical Abstracts*, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", *Chemical Abstracts*, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", *Polym. Mater. Sc. Eng.*, 73, pp. 296–297 (1995).

Hasegawa, et al., "Preparation and Mechanical Properties of Polypropylene–Clay Hybrids Using a Maleic Anhydride–Modified Polypropylene Oligomer", *Journal of Applied Polymer Science*, vol. 67 (1998), pp. 87–92.

Roux, et al., "Influence Of Adhesion Promoters On Properties Short Glass Fiber/Polypropylene Composites", *Annual Technical Conference–Society of Plastics Engineer, 1999*, (vol. 2), 2656–2660.

Duriau–Montagne, et al., Studies Of The Thermal And Thermooxidative Degradation Of Polypropylene During Processing And Usage, *Annual Technical Conference–Society of Plastics Engineer, 1999*, (vol. 2), 2383–2387.

Mayer, et al., "Variation Of Extrusion Conditions—Change Of Polypropylene Properties", *Plastics Engineering Today For Tomorrow's World Annual Technical Conference*, 1983 (99–100).

* cited by examiner

INTERCALATES FORMED WITH POLYPROPYLENE/MALEIC ANHYDRIDE-MODIFIED POLYPROPYLENE INTERCALANTS

FIELD OF THE INVENTION

The present invention is directed to intercalated layered materials and, optionally, exfoliates thereof, prepared by intercalating a layered material, e.g., a phyllosilicate, such as a smectite clay, with polypropylene and maleic anhydride-modified polypropylene intercalants. The intercalated layered material, in the form of a concentrate, is combined with a polypropylene matrix polymer since the addition of polypropylene matrix polymer, after shearing the concentrate for exfoliation, avoids degradation of the later added polypropylene matrix polymer, added after shearing of the concentrate. The polypropylene and maleic anhydride-modified polypropylene polymer can be intercalated in the form of a polymer or an oligomer capable of polymerization to form the polymer, (e.g., an ethylene oligomer or polymer and/or a propylene oligomer or polymer and/or copolymers thereof) or, can be unexpectedly easily intercalated as the oligomer or polymer by direct compounding, e.g., by combining the polypropylene oligomers and/or polymers in a mixing or extruding device at or above the polypropylene polymer melt temperature, to produce the intercalated layered material and, subsequently, the nanocomposite by addition of matrix polypropylene polymer.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for intercalation of the polymer between the layers, thereby substantially increasing the interlayer (interlaminar) spacing between the adjacent silicate layers. The thus-treated, intercalated phyllosilicates, having interlayer spacings increased by at least 3 Å, preferably at least 5 Å, e.g., to an interlayer (interlaminar) spacing of at least about 10–25 Å and up to about 100 Angstroms, then can be exfoliated, e.g., the silicate layers are separated, e.g., mechanically, by high shear mixing. The individual silicate layers, when admixed with a matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published;PCT disclosure of Allied Signal, Inc. WO 93/04118 and U.S. Pat. No. 5,385,776, disclosing the admixture of individual platelet particles (exfoliated platelets) derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules.

Maxfield U.S. Pat. No. 5,514,734 ('734) discloses intercalation of clay with both a coupling agent (silane, titanate or zirconate) and onium ions together with in-situ polymerization of a nylon polymer precursor, such as polymerizable nylon monomers, e.g., ε-caprolactam, capable of in-situ polymerization to form a polymer that is reactive with the coupling agent to tether the polymer to the clay platelets. In accordance with the present invention, a coupling agent-reacted and onium compound-intercalated layered silicate material is polymer melt processed for unexpectedly better dispersibility of the exfoliated platelets throughout a matrix polymer, particularly non-polar matrix polymers, such as polyolefins, especially polypropylene. In accordance with the present invention, the coupling agent preferably is not reactive with the matrix polymer, so that the matrix polymer is not tethered to the clay platelets. The Maxfield '734 patent is hereby incorporated by reference for its disclosure of coupling agents useful in accordance with the present invention.

OPTIONAL COUPLING AGENT REACTION

Edges of clay layered materials are replete with hydroxy groups (—OH) that make it extremely difficult to intercalate non-polar and low polarity oligomers and polymers. In accordance with the preferred embodiment of the present invention, as disclosed in copending application 28682/10296 filed concurrently herewith, it has been found that by reacting the —OH groups at the edges of clay platelets with a coupling agent, to form coupling agent covalent bonds at the clay edges, the clay becomes much more receptive to intercalation of such non-polar and low polarity oligomers and polymers, such as ethylene and propylene homopolymers and copolymers. It should be understood, however, that it is not essential to react the layered material edges with a coupling agent in accordance with the present invention since polyolefin intercalant(s) can be intercalated without the coupling agent reaction, particularly when incorporating a relatively small percentage, e.g., about 1–9% by weight, preferably about 1% to about 5% by weight, of maleic anhydride-modified polypropylene in addition to the polypropylene intercalant.

Useful coupling agents include those selected from the group consisting of silanes, titanates, aluminates, zirconates, and mixtures thereof; particularly the organosilanes, organotitanates, organoaluminates and/or organozirconates. The coupling agent(s) can be reacted with the —OH functionalities at the edges of the layered material platelets by contacting the layered material, before, during, or after onium ion intercalation, with the coupling agents, in the form of a gas, neat liquid, finely divided (e.g., non-colloidal) solid, or solute in a solvent. While onium ion intercalation is preferred, it should be understood that onium ion intercalation also is not necessary in accordance with the present invention when maleic anhydride-modified polypropylene is incorporated into the clay together with the polypropylene. The concentration of coupling agent, when used, should be at least about 0.1%, preferably in the range of about 0.1% to about 10% by weight, more preferably in the range of about 0.5% to about 6% by weight, and most preferably about 1% to about 4% by weight, based on the dry weight of the layered material. The preferred coupling agents have a structure as follows:

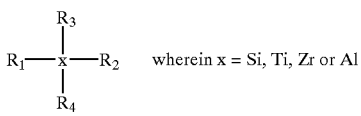

wherein $R_1$ is an organic radical, preferably an alkyl radical or an amine radical, bonded directly to the Si, Ti, Zr or Al atom (x) and at least one of $R_2$, $R_3$ and $R_4$ is a radical containing a functionality, preferably an organic functionality, capable of a condensation reaction with a hydrogen from the —OH groups at the edges of the layered material, preferably selected from H, halogen, alkoxy, acyloxy and amine.

The —OH reaction of the coupling agent, e.g., silane, can be accomplished by either adding the silane to a dry onium-intercalated clay, i.e., organoclay, or by adding the silane to a water slurry of the organoclay, followed by removal of by-products and solvent during heat treatment. Alternatively, the silane also be added to the polymer-organoclay nanocomposite by integral blend methods. In this method, undiluted silane is added to the polymer either before or after introduction of the onium-intercalated clay or organoclay. It is preferable to add the silane before introduction of the clay because this allows for better dispersion and distribution of the silane into the polymer.

In addition to platelet edge —OH reaction with a coupling agent, the layered material also is intercalated with onium ions, e.g., ammonium ions, having a general structure of:

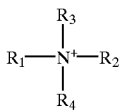

Where $R_1$ is a $C_2$–$C_{22}$ alkyl chain, straight chain or branched, and $R_2$, $R_3$ and $R_4$, same or different, is hydrogen or an alkyl aryl or alkyl moiety, preferably a is $C_1$–$C_8$ alkyl chain.

In accordance with an important feature of the present invention, the layered material is intercalated with a substantial majority of polypropylene, e.g., about 90% to about 99.5% by weight polyolefin, preferably polypropylene homopolymer, and about 0.2% to about 10%, preferably about 1% to about 7%, more preferably about 1.5% to about 3% by weight maleic anhydride-modified polyolefin, based on the total weight of the intercalant oligomers or polymers and matrix polymer. The resulting polyolefin/modified polyolefin intercalated nanocomposite has improved mechanical properties and heat stability over traditional polyolefin-intercalated nanocomposites, it is theorized due to the combination of the polyolefin with a modified polyolefin enabling more complete intercalation of the polyolefin intercalants between clay platelets for surprisingly better exfoliation and dispersibility of clay platelets and fewer, thinner tactoids.

OPTIONAL ONIUM ION INTERCALATION

The interlaminar spacing of adjacent layers (platelets) of the coupling agent-reacted layered material is expanded at least about 3 Å, preferably at least about 5 Å, to a basal spacing of at least about 10 Å, preferably to at least about 15 Å, and usually to about 18 Å in any manner known in the art, preferably by contacting the layered material with an onium ion spacing agent for subsequent intercalation with polyolefin and maleic anhydride-modified polyolefin oligomers or polymers. The optional onium ion may be primary, secondary, tertiary or quaternary and preferably is a long chain ($C_6+$) onium ion spacing agent having at least one binding (ion-exchange) site capable of ion-exchanging or replacing $Li^+$, $Na^+$, $K^+$, $Ca^+$, $Mg^{+2}$, or other inorganic cations that 2 5 occur within the interlayer spaces between adjacent layers or platelets of the layered materials. The association of the layered material inorganic cations with the onium ion spacing agent via ion-exchange enables the conversion of the hydrophilic interior clay platelet surfaces to hydrophobic platelet surfaces. Therefore, oligomers or polymers can be easily intercalated between adjacent platelets of the layered material, e.g., smectite clay platelets.

In accordance with the preferred embodiment of the present invention, an olefin oligomer or polymer, such as polyethylene, polypropylene or copolymers thereof, having a weight average molecular weight between about 100 and about 5 million, preferably about 1,000 to about 500,000, and optionally a maleic anhydride-modified polyolefin, is intercalated between adjacent platelets of the layered material, to form an intercalate concentrate. Optionally, the intercalate concentrate is sheared to exfoliate the intercalate into a predominance of individual platelets. The concentration of intercalate, or exfoliate thereof, should be in the range of about 10–90%, preferably 40–70% in the concentrate. The concentrate is then mixed into a matrix polymer, comprising a polyolefin oligomer or polymer and a maleic anhydride-modified polyolefin oligomer or polymer, i.e., by direct compounding of the intercalated layered material with the polymers. The combination of matrix polymer polyolefin(s) and the initial formation of an intercalate and/or exfoliate concentrate, results in a completely homogeneous dispersion of intercalated layered material and/or exfoliated platelets.

Maleic anhydride-modified polypropylene (MAPP) oligomers and polymers are well known for use in making nanocomposites, as disclosed in Hasegawa, et al. *Preparation And Mechanical Properties Of Polypropylene—Clay Hybrids Using A Maleic Anhydride-Modified Polyppropylene Oligomer, Journal of Applied Polymer Science*, Vol. 67, pages 87–92 (1998), hereby incorporated by reference.

The maleic anhydride-modified polypropylene (MAPP) oligomer described in the Hasegawa et al. article from Sanyo Chemical Industries, having an acid value of 52 mg KOH/g, a softening temperature of 145° C., and a weight average molecular weight of about 30,000, is suitable in accordance with the present invention. However, any other available maleic anhydride-reacted polyolefin, preferably polypropylene, also is suitable in accordance with the principles of the present invention. The Hasegawa et al. article teaches using a minimum ratio of maleic anhydride-modified polypropylene (MAPP) to polypropylene homopolymer (PP) of 7% by weight MAPP to 93% by weight PP, when the combination is used to form a nanocomposite. In accordance with the present invention, it has been found that best results are achieved by incorporating a matrix polymer combination of polypropylene and maleic anhydride-modified polypropylene, preferably having less than 7% by weight MAPP, particularly about 1–6% by weight MAPP, based on the total weight of MAPP and PP combined with the clay.

Optionally, the nanocomposite concentrate can be sheared to exfoliate up to 100% of the tactoids or platelet clusters into individual platelets, preferably such that more than 80%; or more than 90% by weight of the layered material can be completely exfoliated into single platelet layers. Quick, easy, and completely homogeneous dispersion of the co-intercalated layered material in a polyolefin matrix polymer is achieved and the resulting nanocomposite has unexpectedly easy polymer intercalation and homogeneous dispersion of the intercalate and/or exfoliate throughout the matrix polymer. Additional matrix polymer, particularly a polyolefin, can be added after shearing so that the added matrix polymer, particularly polyolefin, is not degraded by substantial shearing and is subjected to limited high temperature degradation.

The intercalates of the present invention preferably are dispersed uniformly into a matrix polymer that is a combination of polypropylene and maleic anhydride-modified polypropylene to form a polymer/clay intercalate-containing nanocomposite and/or polymer/exfoliate-containing nanocomposites by direct compounding of the polyolefin-intercalated clay with sufficient matrix oligomers or matrix polymers to form a concentrate, that can later be mixed with additional matrix polymer, without subsequent polymer-degrading shear, to form a nanocomposite. The intercalate concentrate can be directly compounded with the additional pristine matrix polymer, preferably the same as the polymer intercalant, to form a nanocomposite easily, while achieving a nanocomposite material with homogeneously dispersed platelets.

In accordance with a preferred embodiment of the present invention, intercalates are prepared by contacting a phyllosilicate with a monomeric onium ion spacing agent compound. To achieve the full advantage of the present invention, the onium ion should include at least one long chain radical ($C_6+$) that may be aliphatic, straight or branched chain, or aralkyl. Exemplary of such suitable $C_6+$ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the preferred embodiment of the present invention, best results are achieved by mixing the layered material with the onium ions, e.g., $C_6+$ onium ion spacing coupling agent-reacted, in a concentration of at least about 2% by weight, preferably at least about 5% by weight onium ion compound, more preferably at least about 10% by weight onium ion compound, and most preferably about 20% to about 50% by weight, based on the weight of onium ion compound and carrier (e.g., water, with or without an organic solvent for the onium ion compound) to achieve better sorption of the onium ion spacing agent compound between the platelets of the layered material. Regardless of the concentration of onium ion compound in the onium ion intercalating composition, the weight ratio of polymer intercalant:layered material should be at least 1:20, preferably at least 1:10, more preferably at least 1:5, and most preferably about 1:4 to achieve sufficient oligomer or polymer intercalation of polyolefin and maleic anhydride-modified polyolefin intercalants between adjacent inner surfaces of adjacent platelets of the layered material. The optional, preferred onium ion spacing agent compound ion-exchanged with and bonded to (or complexed with) the aluminosilicate platelets via ion-exchange causes surprisingly easy intercalation of the polyolefin oligomer or polymer intercalants.

The co-intercalation of the preferred combination of a polyolefin and a maleic anhydride-modified polyolefin to form a concentrate intercalate or a concentrate exfoliate, in accordance with the present invention, provides an intercalate or exfoliate concentrate that can be added, particularly by direct compounding (mixing the intercalate directly into a matrix polymer melt, preferably a polyolefin matrix polymer melt that is the same as the intercalated combination of polypropylene and maleic anhydride-modified polypropylene) of the intercalate with a matrix oligomer or matrix polymer that is a combination of polypropylene and a maleic anhydride-modified polypropylene. The intercalate and/or exfoliate concentrate, added to the matrix polymer, improved a number of properties of the matrix polymer, including tensile properties, dimensional stability, ductility, gas-impermeability, and the like.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes a polyolefin oligomer or polyolefin polymer and a maleic anhydride-modified polyolefin oligomer or polymer disposed between adjacent platelets of the Layered Material to increase the interlayer spacing between the adjacent platelets at least 3 Å, preferably at least 5 Å, to an interlayer spacing, for example, of at least about 10 Å, preferably at least about 15 Å;

"Optional Coupling Agent-Treated" or "Optional Coupling Agent-Treatment" or "Optional Coupling Agent-Reacted" shall mean the optional contact of a layered material with a coupling agent, e.g., a silane coupling agent, a titanate coupling agent, a zirconate coupling agent and/or an aluminate coupling agent to produce a condensation reaction between the coupling agent and —OH radicals at the edges of the platelets of the Layered Material.

"Intercalation" shall mean a process for forming an Intercalate.

"Onium Ion Spacing Agent" or "Onium Ion Compound" shall mean an organic compound that includes a positively charged atom selected from the group consisting of a nitrogen atom, a phosphorous atom, a sulfur atom or an oxygen atom, preferably a quaternary ammonium compound, and when dissolved in water and/or an organic solvent, an anion dissociates from the onium ion spacing agent leaving an onium cation that can ion-exchange with a silicate platelet exchangeable cation, e.g., $Na^+$, $Ca^{+2}$, $Li^+$, $Mg^{+2}$, or $K^+$, thereby binding to the silicate platelet inner surface.

"Co-Intercalation" shall mean a process for forming an intercalate by intercalation of an oligomer or polymer of a polyolefin, e.g., polypropylene, and, at the same time or separately, intercalation of a maleic anhydride-modified polyolefin polymer, or intercalation of a maleic anhydride-modified polyolefin oligomer.

"Concentrate" shall mean an intercalate or exfoliate, formed by the Co-Intercalation of a Layered Material to form a concentrate comprising 10–90% polyolefin oligomer or polymer, same as or different than the matrix polymer, and 10–90% polyolefin Intercalate or polyolefin exfoliate.

"Intercalating Carrier" shall mean a carrier comprising water and/or an organic solvent used with the intercalant oligomers or polymers to form an Intercalating Composition capable of achieving Intercalation of the polyolefin co-intercalants and, at the same time or separately, intercalation of the oligomers or polymers between platelets of the Layered Material.

"Intercalating Composition" or "Intercalant Composition" shall mean a composition comprising a Layered Material together with a polyolefin and/or a maleic anhydride-modified polyolefin, with or without an Intercalating Carrier.

"Exfoliate" or "Exfoliated" shall mean individual platelets of a Co-Intercalated Layered Material or tactoids or clusters of individual platelets, e.g., 2–10 platelets, preferably 2–5 platelets, that are smaller in total thickness than the non-exfoliated Layered Material, dispersed as individual platelets or tactoids throughout a carrier material, such as water, a polymer, an alcohol or glycol, or any other organic solvent, or throughout a matrix polymer.

"Exfoliation" shall mean a process for forming an Exfoliate from an Intercalate.

"Matrix Polymer" shall mean a non-polar oligomer or polymer, that the Intercalate or Exfoliate is dispersed within to improve the mechanical strength, thermal resistance, and/or the gas ($O_2$) impermeability of the Matrix Polymer, preferably a polyolefin homopolymer or polyolefin copolymer, particularly polyethylene, polypropylene or copolymers thereof.

SUMMARY OF THE INVENTION

In brief, the present invention is directed to intercalated layered materials prepared by intercalation of a polyolefin, preferably polypropylene, and optionally a maleic anhydride-modified polyolefin, preferably a maleic anhydride-modified polypropylene oligomer or polymer, between the planar layers of a swellable layered material, such as a phyllosilicate, preferably a smectite clay, to form a concentrate. The concentrate can be subjected to substantial sheer to exfoliate a majority of the intercalate; preferably at least 80% by weight of the intercalated layered material is exfoliated into individual platelets and/or tactoids of 2–5 platelet layers. After exfoliation, additional matrix polyolefin polymer can be added to avoid additional shear, thereby avoiding polymer degradation of the matrix polymer added to the concentrate.

The present invention is directed to a method of preparing intercalated layered materials, prepared by intercalation of a polyolefin oligomer or polymer and optionally a maleic anhydride-modified polyolefin oligomer or polymer into the galleries of the layered material to form an intercalate concentrate composition that provides new and unexpected dispersability throughout a matrix polymer, particularly a matrix oligomer or matrix polymer that is a combination of polypropylene, and a maleic anhydride-modified polypropylene.

The present invention also is directed to the intercalates and exfoliates prepared from the intercalate or intercalate concentrate compositions. When the concentrate is mixed with a melt of the combination of a polyolefin and a maleic anhydride-modified polyolefin matrix oligomer or matrix polymer after shearing, (preferably the same polymer as the predominant intercalant polymer), the layered materials are unexpectedly easily dispersed throughout the matrix oligomers or matrix polymers, without degradation by shearing of the added matrix polymer.

The layered material is intercalated, preferably by first contacting the layered material with an onium ion spacing agent and simultaneously or thereafter adding the melted polyolefin oligomer intercalant or melted polyolefin polymer intercalant to the onium ion-intercalated layered material, such as by direct compounding of the layered material and the melted oligomer(s) or polymer(s) intercalant in an extruder, to intercalate the onium ion and melted polyolefin oligomer(s) or polymer(s) between adjacent phyllosilicate platelets and optionally separate (exfoliate) the layered material into individual platelets.

Addition of the intercalate to a polymer melt enhances one or more properties, such as strength, temperature resistance, dimensional stability, ductility, and/or gas impermeability of the polymer; or mixing the intercalate with a carrier or solvent material maintains and/or increases viscosity and thixotropy of the carrier material. The intercalate is easily, homogeneously and uniformly dispersed throughout a matrix oligomer or matrix polymer combination of a polyolefin and a maleic anhydride-modified polyolefin and provides new and unexpected strength properties to non-polar matrix polymers by virtue of the unexpectedly homogeneous dispersability of the co-intercalate and/or exfoliate throughout a low polarity or non-polar matrix oligomer or polymer, particularly a combination of polypropylene and maleic anhydride-modified polypropylene.

DETAILED DESCRIPTION OF THE PREFERRED EMBODIMENTS

To form the intercalated and exfoliated materials of the present invention, the layered material, e.g., the phyllosilicate, should be intercalated with a polyolefin oligomer or polymer, preferably polypropylene, and thereafter melt compounded with a matrix oligomer or matrix polymer combination of a polyolefin, preferably polypropylene, and with an oligomer or polymer of a maleic anhydride-modified polyolefin, preferably polypropylene.

In a preferred embodiment, the interlaminar spacing between adjacent platelets of a layered silicate material, e.g., a phyllosilicate, is expanded for easier co-intercalation by a first treatment with a coupling agent followed by intercalation and ion-exchange of onium ions between the aluminosilicate platelets, prior to or simultaneously with intercalation of the polyolefin oligomer(s) or polymer(s). It should be understood that the oligomer or polymer intercalant(s) can be intercalated between and complexed to the internal platelet faces by other well known mechanisms, such as the dipole/dipole (direct intercalation of the oligomer or polymer) method disclosed in this Assignee's U.S. Pat. Nos. 5,880,197 and 5,877,248, hereby incorporated by reference; and by the acidification technique—by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, both patents hereby incorporated by reference.

OPTIONAL ONIUM ION SPACING AGENT

The onium ion spacing agent is introduced into the layered material galleries in the form of a solid or liquid composition (neat or aqueous, with or without an organic solvent, e.g., an aliphatic hydrocarbon, such as heptane to, if necessary, aid to dissolve the onium ion compound) having an onium ion spacing agent concentration sufficient to provide a concentration of about 5% to about 10% by weight of the clay (90–95% water) and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than 5% water, preferably bone dry, before being compounded (co-intercalated) with the oligomers or polymers, for co-intercalation of the oligomers or polymers and homogeneous platelet dispersion. The optional onium ion spacing agent compound can be added as a solid with the addition to the layered material onium ion compound blend of preferably at least about 20% water, more preferably at least about 30% water or more, based on the dry weight of the layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The optional, but preferred onium ion spacing agent cations intercalated via ion-exchange into the interlayer spaces between adjacent layered material platelets are primary, secondary, tertiary or quaternary onium ions having the following preferred structure:

wherein X=N, P, S, or O; and
wherein $R_1$, $R_2$, $R_3$ and $R_4$ are H or organic moieties, such as linear or branched alkyl, aryl or aralkyl moieties having 1 to about 24 carbon atoms.

The more preferred $C_6+$ onium ions are preferably quaternary ammonium ions having Formula 1, as follows:

Formula 1

Wherein $R_1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$, and $R_4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation.

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

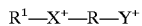

$R^1$—$X^+$—R—$Y^+$ where $X^+$ and $Y^+$, same or different, are ammonium, sulfonium, phosphonium, or oxonium radicals such as
—$NH(CH_3)_2^+$, —$NH_2(CH_3)^+$, —$N(CH_3)_3^+$,
—$N(CH_3)_2(CH_2CH_3)^+$, —$N(CH_3)(CH_2CH_3)_2^+$,
—$S(CH_3)_2^+$,
—$S(CH_3)_2^+$, —$P(CH_3)_3^+$, —$NH_3^+$,
and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and/or $O^+$ cations and $R^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Examples of $R^1$ include non-existent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloatkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclo-octylene, cycloheptylene and the like; alkoxyalkylenes such as methoxy-methylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxy-ethylene, moieties of the formula —$C_3H_6COO$—, —$C_5H_{10}COO$—, —$C_7H_{10}COO$—, —$C_7H_{14}COO$—, —$C_9H_{18}COO$—, —$C_{11}H_{22}COO$—, —$C_{13}H_{26}COO$—, —$C_{15}H_{30}COO$—, and —$C_{17}H_{34}COO$— and —$C=C(CH_3)COOCH_2CH_2$—, and the like. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

The preferred multi-charged spacing/coupling agent compounds are multi-onium ion compounds that include at least two primary, secondary, tertiary or quaternary ammonium, phosphonium, sulfonium, and/or oxonium ions having Formula 2, as follows:

Formula 2

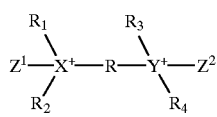

wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R^1$, $R_2$, $R_3$ or $R_4$. Also, one or both of $Z^1$ and $Z^2$ may include one or more positively charged atoms or onium ion molecules.

Any swellable layered material that sufficiently ion-exchanges with the onium ion spacing agent at the internal platelet faces to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof, particularly $Na^+$.

The amount of onium ion spacing agent intercalated into the swellable layered materials, in order that the intercalated layered material platelet surfaces sufficiently complex or bond via ion-exchange to the onium ion spacing agent molecules such that the layered material may be sufficiently spaced for easy intercalation of an oligomer or polymer may vary substantially between about 2%, preferably at least about 10%, and up to about 80%, based on the dry weight of the layered material. In the preferred embodiments of the invention, amounts of onium ion employed, with respect to the dry weight of layered material being intercalated, will preferably range from about 8 grams of onium ion spacing agent compound:100 grams of layered material (dry basis), preferably at least about 10 grams of onium ion spacing agent compound:100 grams of layered material to about 80–90 grams onium ion spacing agent compound:100 grams of layered material. More preferred amounts are from about 20 grams of onium ion spacing agent compound:100 grams of layered material to about 60 grams of onium ion spacing agent compound:100 grams of layered material (dry basis).

The polyolefin oligomer or polymer (and optionally a maleic anhydride-modified polyolefin oligomer or polymer) intercalant may be introduced into (sorbed within) the interlayer spaces of the layered material in a number of ways. In one method of intercalating the oligomer or polymer intercalant between adjacent platelets of the layered material, the layered material is slurried in water, e.g., at 5–20% by weight layered material and 80–95% by weight water, and an onium ion compound is dissolved in the water in which the layered material is slurried. If necessary, the onium ion compound can be dissolved first in an organic solvent, e.g., propanol. The layered material then is separated from the slurry water and dried prior to melt compounding with the oligomer or polymer intercalant (or co-intercalants) for intercalation of the polyolefin (and optionally the maleic anhydride-modified polyolefin oligomer or polymer co-intercalant) to form the nanocomposite material in a concentrated form in a polyolefin and maleic anhydride-modified polyolefin matrix oligomer or matrix polymer.

The coupling agent may be reacted with the layered material, preferably in an amount of about 2–4% by weight, based on the weight of the layered material, before or after (or simultaneously with) the onium ion-exchange intercalation. Preferred reaction conditions (which may vary considerably) include a temperature of about 70–75° C., a pH of about 3–5, to completion of the reaction. The coupling agent reaction can be performed in a slurry media or dry blending conditions. These lower reaction temperatures are preferred to allow the coupling agent to react at edge hydroxy groups more homogenously over the entire layered material edges. In addition, the coupling agent may be introduced to the layered silicate in situ during the polymer melt compounding process. In a preferred method of intercalating the polymer, the coupling agent reacted and onium ion-treated layered material is intimately mixed with the polymer, e.g., by extrusion or pug milling, to form an intercalating composition comprising the coupling agent-reacted/onium ion-intercalated layered material and the intercalant polymer. In a preferred method of intercalating the oligomer or polymer intercalant, a coupling-agent reacted and onium ion-exchanged layered material is intimately mixed with a melt of the polymer co-intercalants, e.g., by extrusion or pug milling, to form an intercalating composition comprising a coupling agent-reacted/onium ion-intercalated layered material and a melt of the co-intercalant polyolefin and maleic anhydride-modified matrix oligomers or matrix polymers to form a co-intercalated concentrate composition for later dilution by the addition of matrix oligomers or matrix polymers to form the nanocomposite.

The coupling agent-treated layered material and onium ion intercalating composition preferably contains at least about 5% by weight, more preferably at least about 10% by weight onium ion compound, based on the dry weight of the coupling agent-treated layered material, so that the resulting onium ion-intercalated (ion-exchanged) layered material has interior platelet surfaces that are sufficiently hydrophobic and sufficiently spaced for co-intercalation of the polyolefin and maleic anhydride-modified polyolefin oligomers or polymers. The amount of the coupling agent, when used, should be at least 0.1% by weight, based on the dry weight of the layered material, preferably in the range of 0.5% to 60% by weight, based on the dry weight of the layered material. The onium ion carrier (preferably water, with or without an organic solvent) can be added by first solubilizing or dispersing the onium ion compound in the carrier; or a dry onium ion compound and relatively dry coupling agent-treated phyllosilicate (preferably containing at least about 4% by weight water) can be blended and the intercalating carrier added to the blend, or to the phyllosilicate prior to adding the dry onium ion. When intercalating the phyllosilicate with onium ions in slurry form (e.g., 900 pounds water, 100 pounds phyllosilicate, 100 pounds onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the coupling agent-treated phyllosilicate prior to adding the onium ion compound, either dry or in solution. Ion-exchange of the onium ion compound molecules may be performed by exposing the coupling agent-treated layered material to a dry or liquid onium ion compound in the onium ion intercalating composition containing at least about 2% by weight, preferably at least about 5% by weight onium ion compound, more preferably at least about 10% onium ion compound, based on the dry weight of the layered material.

In accordance with another method of intercalating the onium ions and the polyolefin oligomer(s) or polymer(s) between the platelets of the coupling agent-reacted layered material, the layered material, preferably containing at least about 4% by weight water, more preferably about 10% to about 15% by weight water, is blended with water and/or organic solvent solution of an onium ion spacing agent compound in a ratio sufficient to provide at least about 5% by weight, preferably at least about 10% by weight onium ion compound, based on the dry weight of the layered material. The onium ion compound can be intercalated and ion-exchanged into a coupling agent-reacted layered material simultaneously with onium ion spacing agent contact with the layered material and simultaneously with the intercalation of the preferred polyolefin intercalant (and optionally a maleic anhydride-modified co-intercalant) oligomer(s) or polymer(s); or, the intercalant oligomer(s) or polymer(s) may be intercalated without or after coupling agent-reaction and intercalation of the onium ion spacing agent. In preferred embodiment, the dry onium ion-intercalated clay is extruded with a melt of the intercalant oligomer(s) or polymer(s) for direct compounding, with intercalation of the intercalant oligomer(s) or polymer(s) melt into the layered material with or without the coupling agent-reaction.

In accordance with a preferred embodiment of the present invention, the coupling agent-reacted/onium ion-intercalated (ion-exchanged) layered material can be intercalated with oligomer or polymer by direct melt compounding in an extruder and then the intercalate is dispersed into a combination of a melt-processible, preferably polyolefin, matrix oligomer or polymer, and a melt-processible maleic anhydride-modified oligomer or polymer, to form the nanocomposite. The matrix oligomers or matrix polymers for use in this embodiment of the process of this invention comprise a vinyl polymer or copolymer, particularly a polypropylene homopolymer having a melt flow index of preferably about 0.5 to about 60, more preferably about 5–10. The matrix polymer is added to the concentrate of co-intercalated layered material without extrusion of the added matrix polymer, after extruding the layered material with a melt of the polyolefin and maleic anhydride-modified polyolefin to form the nanocomposite concentrate in an extruder. The preferred matrix polyolefin oligomer or polymer preferably includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

The most preferred thermoplastic homopolymers and copolymer matrix polymers for forming nanocomposites with the coupling agent-reacted onium ion/polymer co-intercalated layered materials of the present invention are polymers formed by polymerization of alpha-beta-unsaturated monomers of the formula:

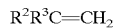

wherein:

$R^2$ and $R^3$ are the same or different and are cyano, phenyl, carboxy, alkylester, halo, alkyl, or alkyl substituted with one or more chloro or fluoro, or hydrogen atoms. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are homopolymers of poly(ethylene) and poly(propylene), and block and random copolymers thereof, especially polypropylene.

The following polypropylenes and copolymers of polypropylene are all useful as both non-polar intercalants and as matrix polymers in accordance with the present invention.

Polypropylene homopolymer contains only propylene monomer in the polymer chain. The homopolymer provides stiffness and toughness but exhibits low impact strength at low temperatures, and clarity is too low for some applications. Propylene copolymers contain one or more different types of monomers in the polymer chain. Random copolymers are used in applications requiring higher clarity or a lower melting point, and impact copolymers are used in automotive and other applications that require high impact resistance at low temperatures. Thermoplastic olefins and thermoplastic vulcanizates provide elastomeric properties for automotive, medical, and other applications.

Random block copolymers are recently developed copolymers in which particles of ethylene propylene rubber are distributed through a random copolymer polypropylene matrix. Random block copolymers display high stiffness and toughness, and the added softness of the random copolymer matrix results in less stress whitening than in impact copolymers. Random copolymers are produced by adding the comonomer, ethylene or, less commonly, 1-butene or 1-hexene, to the reactor during the polymerization reaction. The comonomer substitutes for propylene in the growing polymer chain. Insertions are randomly or statistically distributed along the chain and can consist of single monomers, or multiple monomers (two or more sequential ethylene molecules along the polymer chain). Random copolymers generally contain 1–7 wt.% ethylene, with 75% single and 25% multiple insertions. In practice, depending on the catalyst, polymerization conditions, and the reactivity of the comonomer compared to propylene, random copolymers can become somewhat blocky, with some regions of the polymer chain containing only polypropylene units and other regions containing only comonomer.

The structure of random copolymers is similar to isotactic polypropylene, but the regular, repeating arrangement of atoms is randomly disrupted by the presence of comonomer units. The effect is similar to that of increasing atacticity. Crystallinity is reduced, and mobility of the polymer chain is increased due to less stearic interaction of the pendant methyl groups of polypropylene.

Plastomers are very low density (<0.880 g/cc) copolymers of ethylene and an olefin (such as ethylene-butene) produced using metallocene catalysts. Due to the single polymerization site on metallocene catalysts, comonomer can be inserted uniformly, producing a homogeneous copolymer with both elastomeric and plastic characteristics. They have a narrow molecular weight distribution and more long-chain branching.

Impact copolymers containing ethylene-propylene rubber are also useful as the matrix polymer and polymer intercalate in accordance with the present invention. Homopolymer formed in the first reactor is transferred to a second reactor, where copolymerization with ethylene is performed to produce ethylene-propylene rubber within the polypropylene matrix.

Thermoplastic olefins (TPOs) are a blend of two polymer systems, with usually polypropylene or polyvinyl chloride as the crystalline matrix and ethylene propylene (EP) rubber, ethylene propylene diene monomer (EPDM), or metallocene-produced plastomers (i.e. ethylene-octene, ethylene-butene) as the elastomeric phase. The distinction between impact copolymers and thermoplastic olefins is not well defined; usually elastomer levels over about 20% are referred to as thermoplastic olefins. TPOs can be made by blending EPDM or EP rubber with polypropylene in a batch mixer or by forming the EP rubber phase during propylene polymerization in the reactor.

Depending on the formulation, thermoplastic olefins can be flexible or rigid; flexural moduli can range from 70 MPa (10,000 psi) to 2000 MPa (300,000 psi). Typical properties include high heat resistance, high melt flow, and superior low temperature impact resistance. Thermoplastic olefins can maintain ductile impact behavior at −34° C. (−30° F.).

In testing of equivalent 70/30 polypropylene/elastomer blends, plastomers doubled the weld-line strength and raised the melt index by up to 50% compared to EPDM, with a superior balance of flow and low-temperature impact properties. Plastomers maintained ductile behavior at −34° C. (−30° F.) with homopolymers of 4–35 g/10 minute melt flow indices, while EPDM and ethylene propylene monomer (EPM) blends were brittle with polypropylenes of 20 g/10 minute melt indices.

Thermoplastic vulcanizates (TPV), a type of thermoplastic elastomer, are a blend of a thermoplastic, usually polypropylene, and a rubber, similar to a thermoplastic olefin; however, the rubber phase in thermoplastic vulcanizates is crosslinked or vulcanized. EPDM is most commonly used as the elastomeric phase; other elastomers used include EP rubber, butyl rubber, and natural rubber. The elastomeric phase, consisting of small, 1–2 μm rubber particles, is dispersed in the continuous polypropylene matrix. Elastomeric performance properties of the TPV are determined by the crosslinking of the elastomeric phase, while the polypropylene phase provides for melt processability. TPVs can be fully or partially crosslinked.

The matrix polymer of the present invention may include various optional components which are additives commonly employed with polymeric compositions. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated layered material included may vary widely. It is preferred that the intercalate or platelet loading be less than about 10% by weight of the polymeric composition. Intercalate or platelet particle loadings within the range of about 0.01% to about 40% by weight, preferably about 0.05% to about 20%, more preferably about 0.5% to about 10% of the total weight of the composition.

In accordance with an important feature of the present invention, the intercalate and/or platelet/carrier compositions of the present invention can be manufactured in a concentrated form, e.g., as a concentrate, e.g, having about 10–90%, preferably about 20–80% intercalate and/or exfoliated platelets of layered material and about 10–90%, preferably about 20–80% matrix polymer. The concentrate can be dispersed in the matrix polymer and optionally exfoliated, before the addition of more matrix polymer to prevent degradation of the added matrix polymer by avoiding matrix polymer—degrading shearing.

When shear is employed for exfoliation, any method which can be used to apply a shear to the intercalate/matrix polymer nanocomposite composition can be used to exfoliate the platelets in the concentrate composition. The shearing action can be provided by any appropriate method, as for example by mechanical means, by thermal shock, by pressure alteration, or by ultrasonics, all known in the art. In particularly useful procedures, the concentrate composition is sheared by mechanical methods in which the intercalate concentrate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the concentrate composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the concentrate composition to vibrate or to be excited at different phases and thus subjected to shear. These methods of shearing are merely representative of useful methods, and any method known in the art for shearing intercalates concentrate compositions may be used.

Mechanical shearing methods may be employed such as by extrusion, injection molding machines, Banbury® type mixers, Brabender® type mixers and the like. Shearing also can be achieved by introducing the layered material and co-intercalant oligomer(s) or polymer(s) at one end of an extruder (single or double screw) and receiving the sheared material at the other end of the extruder. The temperature of the layered material/intercalant oligomer or polymer composition, the length of the extruder, residence time of the composition in the extruder and the design of the extruder (single screw, twin screw, number of flights per unit length, channel depth, flight clearance, mixing zone, etc.) are several variables which control the amount of shear to be applied to the concentrate composition for exfoliation, prior to adding additional matrix oligomer or polymer.

In accordance with an important feature of the present invention, it has been found that the layered material can be intercalated with non-polar polymer co-intercalants by direct compounding, i.e., by mixing the layered material, e.g., smectite clay, directly with a non-polar polyolefin oligomer or polymer and, optionally a maleic anhydride-modified oligomer or polymer (together or separately) in an extruder to make the co-intercalated clay without significant exfoliation of the clay platelets. The resulting intercalate concentrate can be extruded into a homogeneous nanocomposite concentrate with unexpectedly homogeneous dispersion of the intercalate, and after addition of a combination of a polyolefin matrix oligomer or polymer and a maleic anhydride-modified polyolefin matrix oligomer or polymer, the nanocomposite has exceptional strength characteristics. The intercalate concentrate dispersed within the matrix oligomers or matrix polymers is a combination of exfoliated individual platelets and multi-layer tactoids dispersed in the matrix polymers. The tactoids have the thickness of at least two individual platelet layers plus one to five monolayer thicknesses of co-intercalated polyolefin and maleic anhydride-modified polyolefin intercalants, and include small multiples or aggregates of platelets, in a coplanar aggregate, having oligomer or polymer co-intercalants bonded or complexed or ion-exchanged to the platelet surface(s).

Molding compositions comprising the combination of MAPP and PP matrix oligomers or matrix polymers containing a desired loading of the intercalates of the present invention, and/or individual platelets obtained from exfoliation of the intercalates manufactured according to the present invention, are outstandingly suitable for the production of sheets, films and panels having valuable properties. Such sheets, films and panels may be shaped by conventional processes, such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets, films and panels can be laminated to other plastic films, sheets or panels and this is preferably effected by co-extrusion, the sheets being bonded in the molten state. The surfaces of the sheets, films and panels, including those in the embossed form, can be improved or finished by conventional methods, for example by lacquering or by the application of protective films.

The nanocomposites of the present invention are also useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed intercalate, and/or exfoliated platelets thereof, which has been intercalated in accordance with the present invention, to form an intercalate concentrate, is then combined with pristine (non-sheared) matrix oligomers or matrix polymers (e.g., MAPP and PP) to form the preferred embodiment of the nanocomposite compositions of the present invention. The nanocomposite compositions can be formed into a film by suitable film-forming methods. Typically, the composition is melted and forced through a film forming die after oligomer or polymer intercalation and melt compounding. The film of the nanocomposite may go through sequential steps to cause the intercalate and/or exfoliated platelets thereof to be further oriented so the major planes through the intercalates and/or platelets thereof are substantially parallel to the major plane through the film. One method to accomplish this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits in addition to decreased permeability to gases, particularly $O_2$: increased modulus; increased wet strength; increased dimensional stability; and decreased moisture adsorption.

EXAMPLES

Example 1

Example 1 demonstrates the formation of silane-treated nanomer A137-ODA-CWC.

One hundred grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to 75~80° C. 37.8 g of Octadecyl-amine, available from Akzo Nobel, was mixed with 70 ml 2 N HCl in 1 liter 75~80° C. de-ionized water. The amine-HCl solution was introduced into the clay dispersion, followed by vigorous mixing. The mixture was adjusted to pH 3~4 by acetic acid, and maintained at 75~80° C. for about 30 minutes. After thorough washing with de-ionized water, the Octadecyl-ammonium treated sodium montmorillonite clay was collected by filtration. The filter cake was re-dispersed into 3 liters of 75~80° C. water.

In a separate container, 2 g Octyltriethoxysilane (A137) was dissolved in 40 g 9:1 (w/w) blend of iso-propanol and de-ionized water. The silane solution was stirred for 1 hour and then added to the dispersed clay slurry. After mixing 20 minutes, the solid was collected by filtration and placed into a 75~80° C. oven to dry followed by particle size reduction. The filter cake also can be freeze-dried. The dried material has a d001 of 22 Å as measured by X-ray diffraction and was coded as A137-ODA-CWC.

Example 2

The procedure of example 1 was repeated to produce a silane-treated organo-clay except that Octyltriethoxysilane was replaced by 3-aminopropyltriethoxysilane (A1100). The dried material has a d001 of 22 Å as measured by X-ray diffraction and was coded as A1100-ODA-CWC.

Example 3

Example 3 demonstrates the formation and properties of a polypropylene (PP) homopolymer nanocomposite with a silane-treated and onium ion-treated nanomer through a direct melt compounding method, and about 2.13% by weight maleic anhydride-modified polypropylene (MAPP), based on the total weight of polypropylene intercalants.

Six parts of A1100-ODA-CWC was incorporated into 92 parts of polypropylene and 2 parts of maleic anhydride-modified polypropylene (MAPP) using a twin screw extruder at 180–190° C. The presence of MAPP helps to improve the adhesion between the organo-clay and the polypropylene matrix polymer. The resulting pellets were injection molded into testing bars. X-ray diffraction shows the treated clay has a well ordered intercalation structure with a d001 of 29 Å. Physical properties of the thus-formed specimens were measured, and the results are shown in Table 1.

Example 4

Example 4 demonstrates the formation and properties of a PP nanocomposite with onium ion-intercalated clay (ODA-CWC nanomer—no silane treatment) and about 2.13% by weight MAPP, as shown in Example 3, through a direct melt compounding method.

Six parts of ODA-CWC was incorporated into 92 parts of polypropylene and 2 parts of maleic anhydride-modified polypropylene (MAPP) using a twin screw extruder at 180–190° C. The presence of MAPP helps to improve the adhesion between the organo-clay and the polypropylene matrix polymer. The resulting pellets were injection molded into testing bars. X-ray diffraction shows the treated clay has a well ordered intercalation structure with a d001 of 28 Å. Physical properties of the thus-formed specimens were measured, and the results are shown in Table 1.

Example 5

Example 5 demonstrates the in situ formation of silane-treated onium ion-intercalated nanomer with the later addition of a silane coupling agent in the extrusion process.

The procedure of Example 4 was repeated, with the exception that 0.09 parts of silane A1100 was added during extrusion. The resulting nanocomposite has a d001 of 29 Å. The physical properties of the testing bars are shown in Table 1. In the case of Example 4 and Example 5, the presence of silane will improve the interaction between the onium ion-intercalated clay and the polypropylene matrix polymer. As a result, both approaches give improved mechanical properties compared with normal ODA-CWC clay (Example 4).

Example 6

Example 6 demonstrates the preparation of a polypropylene matrix polymer/nanomer master batch, or concentrate, by using the silane-treated nanomers, and the properties of the subsequent nanocomposites.

Seventy parts of ODA-CWC was mixed with 30 parts of MAPP in a mixing bowl at 180° C. for 5 minutes to make a master batch concentrate containing about 43% by weight MAPP and about 57% by weight onium ion-intercalated clay (organoclay). The resulting concentrate composition (ODA-CWC-MAPP) was chopped down into powder using a grinder. 8.6 parts of ODA-CWC-MAPP composition was mixed with matrix polymer comprising 89.4 parts of polypropylene and 2 parts of MAPP (≈2.2% MAPP) in a low shear, twin screw extruder (Leistrich 27 mm twin screw compounder with L/D=36:1) at 180–190° C. The resulting pellets were injection molded into testing bars. The nanocomposite has a d001 of 29 Å. Physical properties of the thus-formed specimens were measured, and the results are shown in Table 1.

Example 7

Example 7 demonstrates the preparation of a polypropylene matrix polymer/nanomer master batch, or concentrate, by using the silane-treated nanomers, and the properties of the subsequent nanocomposites.

The procedure of Example 6 was repeated, except that ODA-CWC was replaced by A1100-ODA-CWC. The nanocomposite has a d001 of 29 Å.

Example 8

Example 8 demonstrates the preparation of a polypropylene matrix polymer/nanomer master batch, or concentrate, by using the conventional nanomer and silane coupling agent through a mixing device, and the properties of the subsequent nanocomposites.

The procedure of Example 6 was repeated, except that 0.009 parts of A1100 (3-aminopropyltriethoxysilane) was added during extrusion. The thus-formed nanocomposite has a d001 of 30 Å. In Examples 6–8, since the clays were pre-mixed in MAPP matrix polymer, it is easier for the clay particles to disperse homogeneously within the polypropylene matrix polymer. As a result, better dispersion and improved mechanical properties are obtained by this master batch approach. In addition, silane treatment also improves the interaction between clay and the matrix polymer; and silane-treated clay (Examples 7 and 8) shows better mechanical properties, especially tensile strength and heat distortion temperature, compared with non-silane treated clay (Example 6).

TABLE 1

Mechanical Properties of PP, and PP-Clay Nanocomposites.

| | Processing Method | Filler | Tensile Strength (Mpa) | Tensile Modulus (GPa) | Flexural Strength (Mpa) | Flexural Modulus (Gpa) | Notched Izod Impact (ft-1b/in) | HDT (° C.) |
|---|---|---|---|---|---|---|---|---|
| Neat PP Montell | Direct melt compounding | None | 29.6 | 1.3 | 37.6 | 1.3 | 0.5 | 92 |

TABLE 1-continued

Mechanical Properties of PP, and PP-Clay Nanocomposites.

| | Processing Method | Filler | Tensile Strength (Mpa) | Tensile Modulus (GPa) | Flexural Strength (Mpa) | Flexural Modulus (Gpa) | Notched Izod Impact (ft-1b/in) | HDT (° C.) |
|---|---|---|---|---|---|---|---|---|
| Profax 6523 | | | | | | | | |
| Example 3 | Direct melt compounding | A1100-ODA-CWC | 32.7 | 1.8 | 46.5 | 1.7 | 0.6 | 104 |
| Example 4 | Direct melt compounding | ODA-CWC | 33.2 | 1.7 | 46.3 | 1.6 | 0.5 | 103 |
| Example 5 | Direct melt compounding | ODA-CWC* | 32.9 | 2.0 | 48.3 | 1.8 | 0.6 | 107 |
| Example 6 | Master batch | ODA-CWC | 35 | 1.8 | 48.8 | 2.0 | 0.6 | 100 |
| Example 7 | Master batch | A1100-ODA-CWC | 36.3 | 1.9 | 50.9 | 2.0 | 0.6 | 108 |
| Example 8 | Master batch | ODA-CWC* | 35.4 | 2.0 | 51.2 | 2.1 | 0.6 | 109 |

*silane A1100 was added during extrusion.

Relatively low loadings, e.g., 1–10% by weight, preferably about 4% to about 6% by weight, of nanomers can achieve significant increases in the strength of polyolefin polymers. In accordance with the present invention, it has been found that such low loadings of nanomers are particularly effective in polyolefin matrix polymers that contain a small percentage of maleic anhydride-modified polyolefin, preferably polypropylene, e.g., 0.5% to 10%, preferably 1–6% by weight, based on the total weight of polyolefin and maleic anhydride-modified polyolefin matrix polymers. In accordance with one embodiment of the present invention, the nanomer is formed by intercalating a smectite clay, e.g., sodium montmorillonite or calcium montmorillonite clay, with an onium ion first, and then intercalating the resulting organoclay with the same blend of polyolefin/maleic anhydride-modified polyolefin as sued for the matrix polymer.

In the collection of following data, the nanomer was made by forming an organoclay (1.30 E) from sodium montmorillonite clay by contacting the clay with octadecylamine (ODA) and thereafter intercalating the organoclay with a blend of about 2% by weight MAPP and 98% by weight PP homopolymer. This blend (2% MAPP/98% PP) is intercalated into the organoclay, and the same blend is used as the matrix polymer of the resulting nanocomposite. It should be understood that while it is preferred to intercalate the onium ion-intercalated clay with a polyolefin that includes a portion, e.g., 0.5–6% by weight, maleic anhydride-modified polyolefin, the nanomer can be made first by intercalating the onium ion-intercalated clay with any polyolefin or blend of polyolefins, so long as the matrix polymer includes about 0.5% to about 10%, preferably about 1% to about 6% by weight MAPP. The MAPP can be compounded with the PP homopolymer prior to adding the onium ion-intercalated clay, or the MAPP and onium ion-intercalated clay can be combined first to form a solid, preferably powdered, mixture prior to combining the PP homopolymer. Both methods of compounding give similar results. For the following data a Leistrich 27 mm twin screw compounder with L/D 36:1 has been used. Screws were used in co-rotating mode. A "standard" screws configuration was employed as follows:

EXTRUSION COMPOUNDING

Compounder Screw and Zone Configuration

| Zone | Temperature (° C.) | Functions |
|---|---|---|
| 4D | 180 | Conveying |
| 8D | 180 | Conveying |
| 12D | 180 | Conveying |
| 16D | 180 | Kneading/Dispersion |
| 20D | 180 | Atmospheric Venting |
| 24D | 180 | Conveying |
| 28D | 180 | Kneading/Dispersion |
| 32D | 185 | Vacuum Devolitilization (26 in. Hg) |
| 36D | 190 | Conveying & Building Pressure |
| Die | 190 | Strand Pelletizing |

What is claimed is:

1. A nanocomposite concentrate composition comprising about 10 weight percent to about 90 weight percent of a layered silicate material intercalated with a polyolefin and a maleic anhydride-modified polyolefin and about 10 weight percent to about 90 weight percent of a matrix polymer comprising about 93–99.5% by weight of a polyolefin and about 0.5% to about 7% by weight of a maleic anhydride-modified polyolefin, based on the total weight of polyolefin in the matrix polymer, wherein the intercalated layer silicate material is dispersed uniformly throughout the matrix polymer, wherein the polyolefin matrix polymer is selected from the group consisting of homopolymners formed by polymerization of an alpha-beta-unsaturated monomer of the formula:

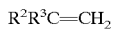
$$R^2R^3C=CH_2$$

wherein:
$R^2$ and $R^3$ are the same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

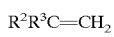
$$R^2R^3C=CH_2$$

wherein:
R² and R³ are the same or different and are cyano, carboxy, alkylester, halo, alkyl, or alkyl substituted with one or more chloro or fluoro, or hydrogen atoms.

2. A nanocomposite composition in accordance with claim 1, wherein the intercalated polyolefin is a polymer or oligomer of polypropylene.

3. A nanocomposite composition in accordance with claim 1, wherein the layered silicate material is intercalated with onium ions that include at least one moiety covalently bonded to a positively charged nitrogen atom that has a length of at least six carbon atoms.

4. A nanocomposite concentrate composition comprising about 10% by weight to about 90% by weight of a layered silicate material reacted with a coupling agent and co-intercalated with an onium ion compound, and a polyolefin polymer or oligomer; and about 10 weight percent to about 90 weight percent of a matrix polymer comprising about 94–99.5% by weight of a polyolefin oligomer or polymer and about 0.5% to about 6% by weight of a maleic anhydride-modified polymer or oligomer; wherein the co-intercalated layered silicate material is dispersed uniformly throughout the matrix polymer, wherein the polyolefin matrix polymer or oligomer is selected from the group consisting of homopolymers formed by polymerization of an alpha-beta-unsaturated monomer of the formula:

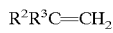

wherein:
R² and R³ are the same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

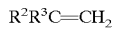

wherein:
R² and R³ are the same or different and are cyano, carboxy, alkylester, halo, alkyl, or alkyl substituted with one or more chloro or fluoro, or hydrogen atoms.

5. A nanocomposite composition in accordance with claim 4, wherein the matrix polymer is intercalated into the layered silicate material.

6. A nanocomposite composition in accordance with claim 4, wherein prior to intercalating the layered material with the polyolefin polymer, the layered material is first intercalated with onium ions that include at least one moiety covalently bonded to a positively charged nitrogen atom that has a length of at least six carbon atoms.

7. A method of increasing the strength of a matrix polymer comprising dispersing throughout said matrix polymer, in an amount of about 0.05% by weight to about 30% by weight, based on the total weight of the matrix polymer and the intercalate, an intercalate formed by intercalating an onium ion between layers of a phyllosilicate, and co-intercalating the phyllosilicate with a polyolefin, wherein the matrix polymer comprises a polyolefin and about 0.5% to 6% by weight of a maleic anhydride-modified polyolefin, based on the total weight of polyolefin and maleic anhydride-modified polyolefin in the matrix polymer, wherein the polyolefin matrix polymer is selected from the group consisting of homopolymers formed by polymerization of an alpha-beta-unsaturated monomer of the formula:

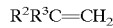

wherein:
R² and R³ are the same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

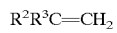

wherein:
R² and R³ are the same or different and are cyano, carboxy, alkylester, halo, alkyl, or alkyl substituted with one or more chloro or fluoro, or hydrogen atoms.

8. A method in accordance with claim 7, wherein the matrix polymer polyolefin is a polymer or oligomer selected from polyethylene, polypropylene, and a copolymer of ethylene and propylene.

9. A method in accordance with claim 8, wherein the intercalant polyolefin is polypropylene and wherein the polyolefin and the maleic anhydride-modified polyolefin of the matrix polymer are both polypropylene.

10. A method in accordance with claim 7, wherein the onium ions include at least one moiety covalently bonded to a positively charged nitrogen atom that has a length of at least six carbon atoms.

11. A method of manufacturing a composite material containing about 10% to about 99.95% by weight of a matrix polymer, and about 0.05% to about 90% by weight of an onium ion-intercalated phyllosilicate material, said matrix polymer comprising 94–99.5% by weight polypropylene and 0.5–6% by weight maleic anhydride-modified polypropylene, comprising:
intercalating the phyllosilicate material with onium ions, and then mixing the matrix polymer, as a melt, throughout said phyllosilicate to achieve intercalation of a portion of the matrix polymer, as melted oligomers or melted polymers, between the phyllosilicate platelets, wherein the polypropylene matrix polymer is selected from the group consisting of homopolymers formed by polymerization of an alpha-beta-unsaturated monomer of the formula:

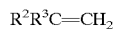

wherein, R² and R³ are the same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

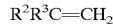

wherein, R² and R³ are the same or different and are cyano, carboxy, alkylester, halo, alkyl, or alkyl substituted with one or more chloro or fluoro, or hydrogen atoms.

12. A method in accordance with claim 11, further including the steps of:
reacting the phyllosilicate with a coupling agent; and
contacting the phyllosilicate with an intercalant onium ion spacing agent, to achieve intercalation of said intercalant onium ion spacing agent between said adjacent phyllosilicate platelets in an amount sufficient to space said adjacent phyllosilicate platelets a distance of at least about 3 Å.

13. The method of claim 12, wherein said phyllosilicate is contacted with said intercalant onium ion spacing agent, said phyllosilicate, and said co-intercalants, and wherein the concentration of the onium ion spacing agent is in a molar ratio of onium ions:phyllosilicate interlayer exchangeable cations of at least 0.25:1.

14. The method of claim 13, wherein the concentration of the onium ion spacing agent is in a molar ratio of onium ions:phyllosilicate interlayer exchangeable cations of at least 0.5:1.

15. The method of claim 14, wherein the concentration of the onium ion spacing agent is in a molar ratio of onium ions:phyllosilicate interlayer exchangeable cations of at least 1:1.

16. A method of manufacturing a composite material containing about 40% to about 99.95% by weight of a matrix polymer comprising about 96% to about 99.5% by weight polyolefin and about 0.5% to about 6% maleic anhydride-modified polyolefin, based on the total weight of polyolefin oligomers and polymers in the matrix polymer, and about 0.05% to about 60% by weight of an intercalated phyllosilicate material, said intercalated phyllosilicate having an intercalant onium ion spacing agent intercalated between adjacent phyllosilicate platelets comprising:

contacting the phyllosilicate with an intercalating composition including an intercalant onium ion spacing agent in a molar ratio of onium ions:phyllosilicate interlayer cations of at least 0.25:1 to achieve intercalation of said intercalant onium ion spacing agent between said adjacent phyllosilicate platelets in an amount sufficient to space said adjacent phyllosilicate platelets at least an additional 3 Å;

combining the intercalated phyllosilicate with said matrix polymer, and heating the matrix polymer sufficiently to provide for flow of said matrix polymer; and dispersing said intercalated phyllosilicate throughout said heated matrix polymer, wherein the polyolefin matrix polymer is selected from the group consisting of homopolymers formed by polymerization of an alpha-beta-unsaturated monomer of the formula:

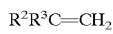
$R^2R^3C=CH_2$ wherein, $R^2$ and $R^3$ are the same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

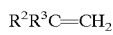
$R^2R^3C=CH_2$ wherein, $R^2$ and $R^3$ are the same or different and are cyano, carboxy, alkylester, halo, alkyl, or alkyl substituted with one or more chloro or fluoro, or hydrogen atoms.

17. A method in accordance with claim 16, wherein the combined intercalated phyllosilicate and heated matrix polymer comprises about 10% to about 200% by weight of said matrix polymer, based on the dry weight of phyllosilicate.

18. A method in accordance with claim 16, wherein the amount of onium ion spacing agent intercalated into the phyllosilicate material is in a molar ratio of at least 0.5:1, onium ions:exchangeable cations in the interlayer spaces of the phyllosilicate material.

19. A method in accordance with claim 18, wherein the amount of intercalant onium ion spacing agent intercalated into the phyllosilicate material is in a molar ratio of at least 1:1, onium ions:exchangeable cations in the interlayer spaces of the phyllosilicate material.

20. A method in accordance with claim 19, wherein the molar ratio of intercalated onium ion spacing agent to interlayer phyllosilicate cations is from about 1:1 to about 1:5.

21. A method in accordance with claim 16, wherein the weight ratio of the matrix polymer to phyllosilicate material, dry basis, is from about 20 grams of matrix polymer co-intercalants per 100 grams of phyllosilicate material to about 200 grams of matrix polymer per 100 grams of phyllosilicate material.

22. A method in accordance with claim 16, further including contacting the phyllosilicate with a coupling agent selected from the group consisting of an organosilane, an organotitanate, an organoaluminate, an organozirconate, and mixtures thereof.

23. A method in accordance with claim 22, wherein the coupling agent is an aminosilane.

24. A method of manufacturing a composite concentrate material containing about 40% to about 99.95% by weight of a polyolefin matrix polymer, and about 0.05% to about 60% by weight of an onium ion intercalated and polyolefin co-intercalated phyllosilicate material comprising:

intercalating the phyllosilicate material with an onium ion spacing agent by contacting the phyllosilicate with onium ions in a molar ratio of onium ions:phyllosilicate interlayer exchangeable cations of at least 0.25:1;

combining the onium ion-intercalated phyllosilicate material with a melt of a polyolefin and a melt of maleic anhydride-modified polyolefin to form said onium ion intercalated and polyolefin co-intercalated phyllosilicate material, wherein the melt comprises about 94–99.5% of a polyolefin and about 0.5–6% of a maleic anhydride-modified polyolefin; and exfoliating a portion of the intercalated phyllosilicate, wherein the polyolefin matrix polymer is selected from the group consisting of homopolymers formed by polymerization of an alpha-beta-unsaturated monomer of the formula:

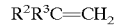
$R^2R^3C=CH_2$ wherein, $R^2$ and $R^3$ are the same or different and are cyano, phenyl, carboxy, alkylester, halo, alkyl or alkyl substituted with one or more chloro or fluoro, or hydrogen atoms; and copolymers formed by polymerization of alpha-beta-unsaturated monomers selected from the group consisting of the formula:

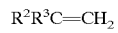
$R^2R^3C=CH_2$ wherein, $R^2$ and $R^3$ are the same or different and are cyano, carboxy, alkylester, halo, alkyl, or alkyl substituted with one or more chloro or fluoro, or hydrogen atoms.

25. The method of claim 24 further including the step of adding more of the co-intercalants as matrix polymer, after exfoliation of the intercalate, to form a nanocomposite composition.

26. A nanocomposite concentrate composition comprising about 10 weight percent to about 90 weight percent of a layered silicate material intercalated with intercalant onium ions and with a polyolefin and a maleic anhydride-modified polyolefin and about 10 weight percent to about 90 weight percent of a matrix polymer comprising about 90–99.5% by weight of a polyolefin and about 0.5% to about 7% by weight of a maleic anhydride-modified polyolefin, based on the total weight of polyolefin in the matrix polymer, wherein the intercalated layered silicate material is dispersed uniformly throughout the matrix polymer, and wherein the weight ratio of onium ion-intercalated layered silicate material to maleic anhydride-modified polyolefin is in the range of 3:1 to 7:3, wherein the polyolefin matrix polymer is selected from the group consisting of homopolymers formed by polymerization of an alpha-beta-unsaturated monomer of the formula:

$$R^2R^3C=CH_2$$

wherein:
R$^2$ and R$^3$ are thee same or different and are cyano, phenyl, carboxy, alkylester, halo, alkyl, or alkyl substituted with one or more chloro or fluoro, or hydrogen atoms; and copolymers formed by polymerization of alpha-beta-unsaturated monomers selected from the group consisting of the formula:

$$R^2R^3C=CH_2$$

wherein:
R$^2$ and R$^3$ are the same or different and are cyano, carboxy, alkylester, halo, alkyl, or alkyl substituted with one or more chloro or fluoro, or hydrogen atoms.

27. A nanocomposite composition in accordance with claim 26, wherein the intercalated polyolefin is a polymer or oligomer of polypropylene.

28. A nanocomposite composition in accordance with claim 26, wherein the layered silicate material is intercalated with onium ions that include at least one moiety covalently bonded to a positively charged nitrogen atom that has a length of at least six carbon atoms.

29. A nanocomposite composition in accordance with claim 26, wherein the matrix polymer comprises about 96–99.5% by weight of said polyolefin and about 1% to about 7% by weight of a maleic anhydride-modified polyolefin.

30. A nanocomposite composition in accordance with claim 29, wherein the matrix polymer comprises about 96–99% by weight of said polyolefin and about 1% to about 6% by weight of a maleic anhydride-modified polyolefin.

31. A nanocomposite concentrate composition in accordance with claim 1, wherein the matrix polymer comprises about 96–99.5% by weight of said polyolefin and about 1.5% to about 3% by weight of a maleic anhydride-modified polyolefin.

32. A nanocomposite concentrate composition in accordance with claim 4, wherein the matrix polymer comprises about 96–99.5% by weight of said polyolefin and about 1.0% to about 6% by weight of a maleic anhydride-modified polyolefin.

33. A method in accordance with claim 7, wherein the matrix polymer comprises about 96–99.5% by weight of said polyolefin and about 1.0% to about 6% by weight of a maleic anhydride-modified polyolefin.

34. A method in accordance with claim 7, wherein the matrix polymer comprises about 96–99.5% by weight of said polyolefin and about 0.5% to about 7% by weight of a maleic anhydride-modified polyolefin.

35. A method in accordance with claim 7, wherein the matrix polymer comprises about 96–99.5% by weight of said polyolefin and about 0.5% to about 7% by weight of a maleic anhydride-modified polyolefin.

36. A method in accordance with claim 7, wherein the matrix polymer comprises about 96–99.5% by weight of said polyolefin and about 0.5% to about 7% by weight of a maleic anhydride-modified polyolefin.

37. A nanocomposite composition in accordance with claim 3, wherein the onium ions are selected from the group consisting of primary onium ions, secondary onium ions, and mixtures thereof.

38. The nanocomposite concentrate composition of claim 1, wherein the polyolefin matrix polymer is a homopolymer of a polyolefin.

39. The nanocomposite concentrate composition of claim 38, wherein the polyolefin matrix polymer is a homopolymer of ethylene or propylene.

40. The nanocomposite concentrate composition of claim 1, wherein the polyolefin matrix polymer is a copolymer of an olefin with a monomer selected from the group consisting of 1-butene, 1-hexene, and ethylene propylene diene.

41. The nanocomposite concentrate composition of claim 40, wherein the olefin is ethylene or propylene.

* * * * *

UNITED STATES PATENT AND TRADEMARK OFFICE
CERTIFICATE OF CORRECTION

PATENT NO.    : 6,462,122 B1  Page 1 of 1
DATED         : October 8, 2002
INVENTOR(S)   : Guoqian Qian et al.

It is certified that error appears in the above-identified patent and that said Letters Patent is hereby corrected as shown below:

<u>Column 27,</u>
Line 20, please change "$R^2$ and $R^3$ are thee" to -- $R^2$ and $R^3$ are the --.

Signed and Sealed this

Eleventh Day of March, 2003

JAMES E. ROGAN
*Director of the United States Patent and Trademark Office*